E. PAIRO.
Treadles for Sewing-Machines.

No. 158,115. Patented Dec. 22, 1874.

Witnesses:
Jas. E. Hutchinson
W. M. Lynch

Inventor.
Edwin Pairo
Edson Bros.
attys.

UNITED STATES PATENT OFFICE.

EDWIN PAIRO, OF BALTIMORE, MARYLAND.

IMPROVEMENT IN TREADLES FOR SEWING-MACHINES.

Specification forming part of Letters Patent No. 158,115, dated December 22, 1874; application filed July 27, 1874.

*To all whom it may concern:*

Be it known that I, EDWIN PAIRO, of the city and county of Baltimore and State of Maryland, have invented a certain new and useful Improvement in Treadles for Sewing-Machines, of which the following is a full, clear, and exact description, reference being had to the annexed drawing, in which—

Figure 1:
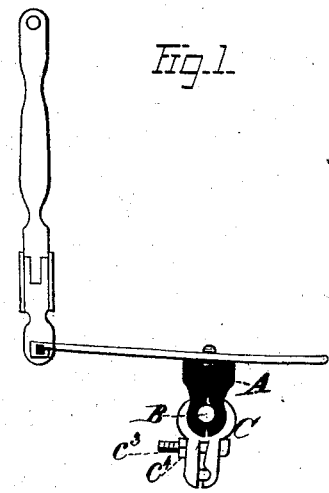
Figure 2:
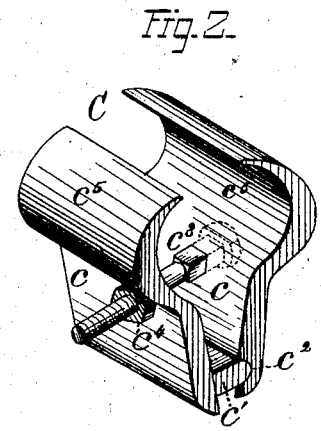

Figure 1 is a side view of the treadle and pitman of a sewing-machine, partly in section, with my improvement applied thereto; and Fig. 2 is a detached perspective view of my improvement.

Corresponding parts in the two figures are designated by like letters.

This invention relates to a certain improvement in treadles for sewing-machines; and it consists in the employment of a clamp adapted to clamp the rubber piece, upon which the treadle or sandal-board is secured, to the rods, to which the sandal-board or treadle, as ordinarily mounted, is directly fulcrumed or attached, substantially as hereinafter more fully set forth.

In the annexed drawing, A refers to a piece of rubber or other elastic material, acting as the fulcrum of the treadle, it being fastened thereon, which receives and is clamped to the rod B, connecting and secured to the legs of the sewing-machine by means of the clamp C. The clamp C is composed of the two plates $c\ c$, one having an inwardly-projecting plate or stud, $c^1$, bearing in a concavity or notch, $c^2$, in the opposite plate, to hold the plates a short distance apart and in proper relative position. A tightening or adjusting screw, $c^3$, with an angular shoulder or enlargement and head on one end, and supplied with a screw-thread and nut, $c^4$, on its opposite portion, passes through and unites the parts $c\ c$ of the clamp. The plates or parts $c\ c$ are provided with curved or semicircular jaws $c^5\ c^5$, to adapt them to the shape which the rubber assumes in being clamped against or around the rod B.

The use of this clamp obviates the necessity of changing the ordinary round rod for a square one, as heretofore experienced, thus lessening the expense, &c., of applying the treadle with a rubber fulcrum to the machine, &c.

I am aware that an elastic fulcrum attached to a shaft forming the support for a treadle is not new, such being shown in the patent of S. B. Bushfield, granted July 8, 1873; reissued October 14, 1873.

Having thus described my invention, what I claim, and desire to secure by Letters Patent, is—

1. The elastic treadle-fulcrum A, surrounding a round rod, B, and curved or semicircular jaws $c^5\ c^5$, in combination, substantially as shown and described.

2. The clamp C, composed of the two plates $c\ c$, having the lateral stud $c^1$ and notch or concavity $c^2$, united by the screw and nut $c^3\ c^4$, and provided with the curved jaws $c^5\ c^5$, substantially as shown and described.

In testimony whereof I have hereunto signed my name in presence of two subscribing witnesses.

EDWIN PAIRO.

Witnesses:
J. W. MISTER,
W. M. LYNCH.